US008832685B2

(12) United States Patent
De Leon, III et al.

(10) Patent No.: US 8,832,685 B2
(45) Date of Patent: Sep. 9, 2014

(54) VIRTUAL NETWORK PACKET TRANSFER SIZE MANAGER

(75) Inventors: Baltazar De Leon, III, Austin, TX (US); James B. Cunningham, Austin, TX (US); Omar Cardona, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 12/825,752

(22) Filed: Jun. 29, 2010

(65) Prior Publication Data
US 2011/0321039 A1 Dec. 29, 2011

(51) Int. Cl.
*G06F 9/455* (2006.01)
*H04L 12/46* (2006.01)

(52) U.S. Cl.
CPC .. *H04L 12/4641* (2013.01); *G06F 2009/45595* (2013.01)
USPC .......................................................... 718/1

(58) Field of Classification Search
None
See application file for complete search history.

(56) References Cited

U.S. PATENT DOCUMENTS

| | | | |
|---|---|---|---|
| 7,613,836 B2 | 11/2009 | Tober et al. | |
| 7,657,659 B1 | 2/2010 | Lambeth et al. | |
| 2002/0147826 A1* | 10/2002 | Sultan | 709/230 |
| 2003/0158959 A1* | 8/2003 | Jayapalan et al. | 709/237 |
| 2005/0060445 A1* | 3/2005 | Beukema et al. | 710/52 |
| 2006/0123204 A1* | 6/2006 | Brown et al. | 711/153 |
| 2007/0118834 A1 | 5/2007 | Brice, Jr. et al. | |
| 2008/0201710 A1 | 8/2008 | Anderson et al. | |
| 2008/0232261 A1* | 9/2008 | Tsuzaki et al. | 370/250 |
| 2008/0240127 A1* | 10/2008 | Cardona et al. | 370/401 |
| 2010/0014526 A1 | 1/2010 | Chavan et al. | |
| 2010/0306391 A1* | 12/2010 | Mason et al. | 709/228 |

OTHER PUBLICATIONS

EMC—"N-Port Virtualization—A Detailed Review", ESX Server 3.5, ESX Server 3i version 3.5, (Feb. 2010).
Richardson—"Virtual Network Computing", IEEE Internet Computing vol. 2, No. 1, (Jan./Feb. 1998).
VMware—"VMware Virtual Networking Concepts", Internet Multimedia Services and Applications IMSAA, 2009 IEEE International Conference, (Jun. 2009).

* cited by examiner

*Primary Examiner* — H S Sough
*Assistant Examiner* — Umut Onat
(74) *Attorney, Agent, or Firm* — David Mims; Mark P Kahler

(57) ABSTRACT

The method determines whether a particular virtual adapter of a virtual network IHS may perform enhanced packet communication transfer of larger sizes than those of physical network IHSs. The method registers each virtual adapter maximum receive unit (MRU) value in an MRU attribute table within a hypervisor virtual switch. The hypervisor virtual switch provides communication pathways for packet transfers between virtual network IHS virtual adapters and also between physical adapters. The method determines if a sending virtual adapter is sending a packet to a receiving virtual adapter that is local or a remote virtual trunk adapter. The method determines if the receiving virtual adapter exhibits a registered MRU value. If the receiving virtual adapter exhibits a registered MRU value, the method provides for larger sizes of packet transfers for those particular packets.

18 Claims, 5 Drawing Sheets

FIG. 3

MRU ATTRIBUTE TABLE 300

| 310 | 320 | 330 |
|---|---|---|
| VIRTUAL ADAPTER 211 | MAC ADDRESS FOR VIRTUAL ADAPTER 211 | REGISTERED MRU FOR VIRTUAL ADAPTER 211 (64 KILOBYTES) |
| VIRTUAL ADAPTER 212 | MAC ADDRESS FOR VIRTUAL ADAPTER 212 | REGISTERED MRU FOR VIRTUAL ADAPTER 212 (0 KILOBYTES) |
| VIRTUAL ADAPTER 213 | MAC ADDRESS FOR VIRTUAL ADAPTER 213 | REGISTERED MRU FOR VIRTUAL ADAPTER 213 (64 KILOBYTES) |
| VIRTUAL TRUNK ADAPTER 222 | MAC ADDRESS FOR VIRTUAL TRUNK ADAPTER 222 | REGISTERED MRU FOR VIRTUAL TRUNK ADAPTER 222 (64 KILOBYTES) |
| VIRTUAL TO PHYSICAL ADAPTER 224 | MAC ADDRESS FOR VIRTUAL TO PHYSICAL ADAPTER 224 | REGISTERED MRU FOR VIRTUAL TO PHYSICAL ADAPTER 224 (9 KILOBYTES) |

Rows: 350, 360, 370, 380, 390

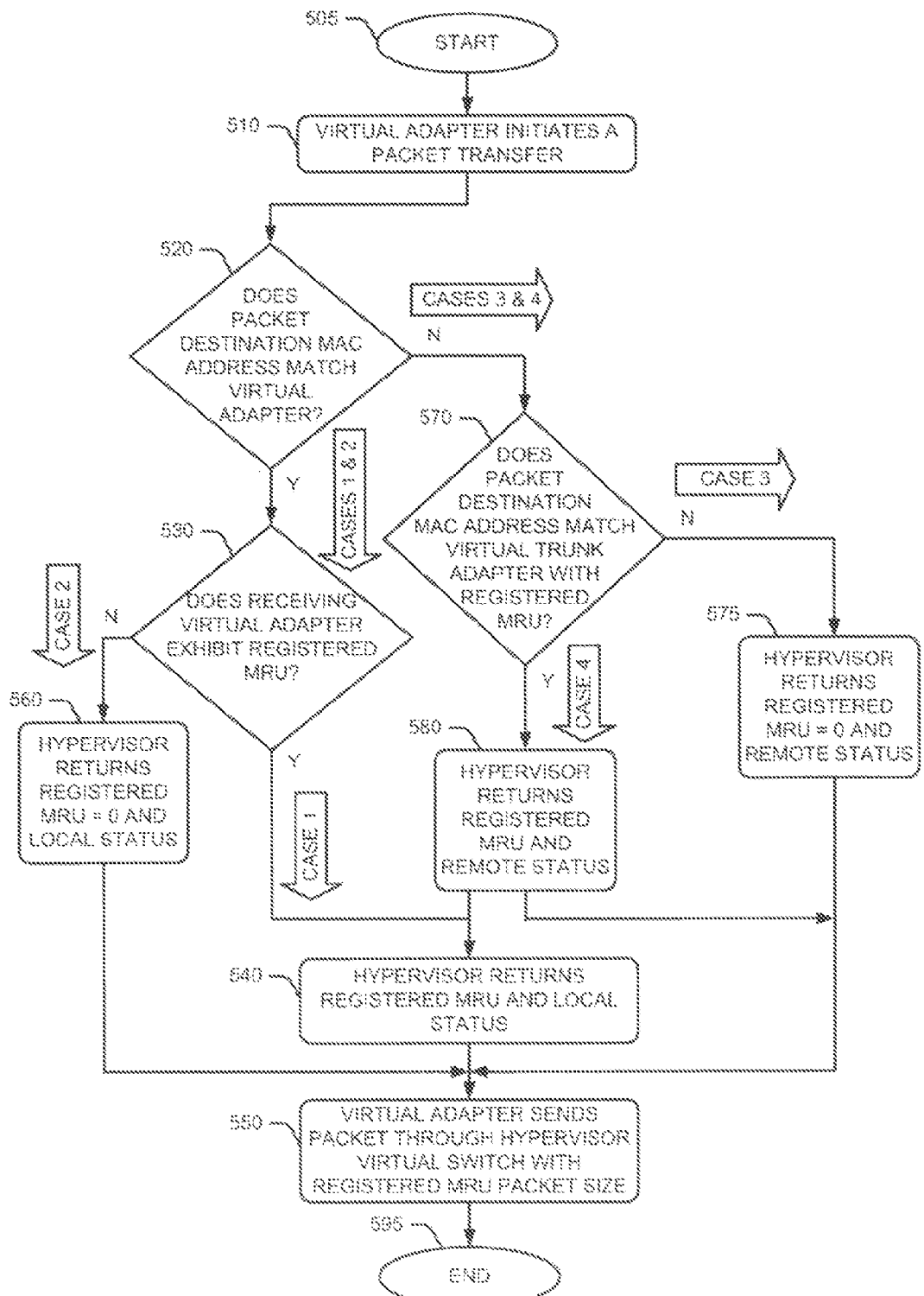
FIG. 5 VIRTUAL ADAPTER MRU ATTRIBUTE DISCOVERY METHOD AND TOOL

VIRTUAL NETWORK PACKET TRANSFER SIZE MANAGER

BACKGROUND

The disclosures herein relate generally to information handling systems (IHSS), and more specifically, to management of data packet communications in a network IHS.

Network information handling systems (IHSS) typically employ operating systems that execute applications or other processes that may require communication with other network IHSS. A network IHS may include one or more network adapters that provide communication capability between network IHSS of the network. Network adapters may communicate with other network adapters using data packets or frames, such as Ethernet packets. In a conventional physical network, communicating adapters may limit data packets sizes to a standard normal size of 1514 bytes (1.5 kilobytes), or in the case of jumbo data packets, 9014 bytes (9 kilobytes). Network adapters of a physical network may exhibit maximum transmission unit (MTU) and maximum receive unit (MRU) attributes that limit or otherwise constrain the size of data packet transmissions.

Virtual networks may emulate the operation of a physical network system in a software or simulation environment. Virtual network operating systems may exhibit the same data packet transmission size restrictions or limitations as network adapters of a physical network. Virtual networks may execute operating system software in a partitioned space much like that of physical or real network environment. Efficient virtual networks may exhibit more flexibility and higher bandwidth than a physical or real network during packet communications, such as Ethernet data packets or frames.

BRIEF SUMMARY

In one embodiment, a method of network communication is disclosed that includes configuring an information handling system (IHS) to include a virtual network. The method also includes configuring a plurality of virtual partitions in the virtual network. The method further includes configuring a respective virtual adapter in each of the virtual partitions, each virtual adapter exhibiting a respective maximum receive unit (MRU) and a respective maximum transmission unit (MTU). The method still further includes providing a hypervisor virtual switch that couples the virtual adapters together. The method also includes registering, by virtual adapters of the plurality of virtual adapters, a respective MRU in the hypervisor virtual switch, thus providing a respective registered MRU for each virtual adapter registered. The method further includes initiating, by a sending virtual adapter, a packet transfer to a receiving virtual adapter using the respective registered MRU of the receiving virtual adapter in the hypervisor virtual switch to specify a packet size for a packet transfer from the sending virtual adapter to the receiving virtual adapter. The method also includes receiving, by the receiving virtual adapter, the packet transfer.

In another embodiment, an information handling system (IHS) is disclosed that includes a processor and a memory coupled to the processor. The memory is configured as a virtual network including a plurality of virtual partitions, a respective virtual adapter being configured in each of the virtual partitions, each virtual adapter exhibiting a respective maximum receive unit (MRU) and a respective maximum transmission unit (MTU), a hypervisor virtual switch coupling the virtual adapters together. The virtual network registers, by virtual adapters of the plurality of virtual adapters, a respective MRU in the hypervisor virtual switch, thus providing a respective registered MRU for each virtual adapter registered. The virtual network initiates, by a sending virtual adapter, a packet transfer to a receiving virtual adapter using the respective registered MRU of the receiving virtual adapter in the hypervisor virtual switch to specify a packet size for a packet transfer from the sending virtual adapter to the receiving virtual adapter. The virtual network receives, by the receiving virtual adapter, the packet transfer.

In yet another embodiment, a computer program product is disclosed that includes a computer readable storage medium for use on an information handling system (IHS) that includes a virtual network. The computer program product includes first instructions that configure a plurality of virtual partitions in the virtual network. The computer program product also includes second instructions that configure a respective virtual adapter in each of the virtual partitions, each virtual adapter exhibiting a respective maximum receive unit (MRU) and a respective maximum transmission unit (MTU). The computer program product further includes third instructions that provide a hypervisor virtual switch that couples the virtual adapters together. The computer program product still further includes fourth instructions that cause the virtual adapters of the plurality of virtual adapters to register a respective MRU in the hypervisor virtual switch, thus providing a respective registered MRU for each virtual adapter registered. The computer program product also includes fifth instructions that cause a sending virtual adapter to initiate a packet transfer to a receiving virtual adapter using the respective registered MRU of the receiving virtual adapter in the hypervisor virtual switch to specify a packet size for a packet transfer from the sending virtual adapter to the receiving virtual adapter. The computer program product further includes sixth instructions that cause the receiving virtual adapter to receive the packet transfer. The first, second, third, fourth, fifth and sixth instructions are stored on the computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 3 shows an MRU attribute table that the disclosed packet manager methodology employs.

FIG. 5 is a flowchart of another embodiment of the disclosed packet manager methodology that manages virtual adapter MRU attribute discovery.

DETAILED DESCRIPTION

Figure 1:
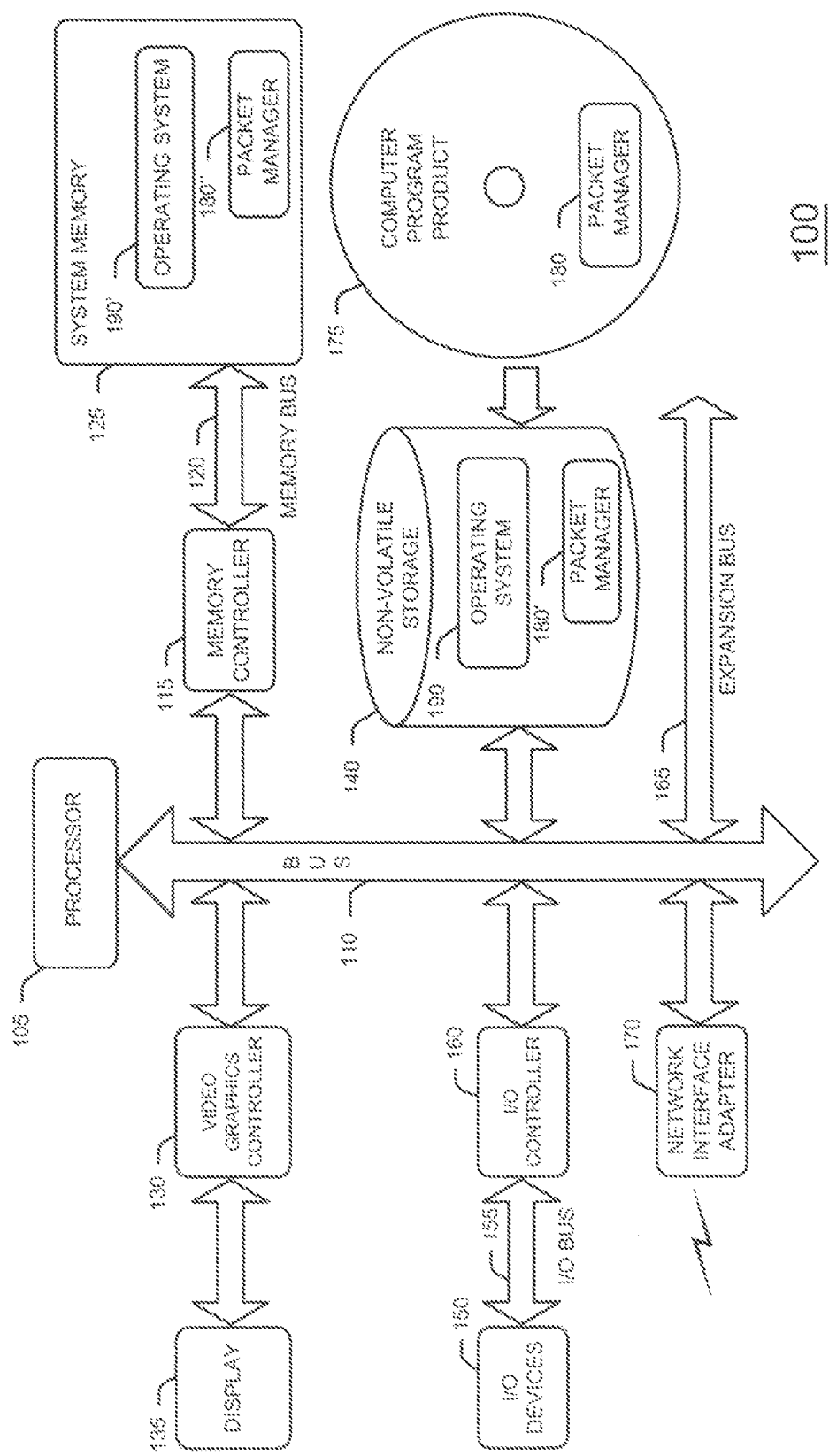
FIG. 1 shows a block diagram of a representative information handling system (IHS) that employs the disclosed packet manager methodology.

Information handling systems (IHSs) typically employ operating systems that execute applications or other processes that may require communication between a network adapter of the IHS and other network adapters. For example, a network IHS may employ network adapters to provide a communication portal or interface between partitions within the network IHS. Ethernet packets provide one type of data communication between partitions of the network IHS. In a physical network, Ethernet "normal packets" are typically 1.5 kilobytes in frame size, while "jumbo packets" are 9 kilobytes in frame size. Other data packet sizes, such as "super jumbo packets" of 64 kilobytes, and still other sizes are possible under the control of the network IHS operating system software, firmware, or other network devices. Each network adapter within the network IHS is capable of managing different packet sizes and creates complexity during management of packet communications between network adapters.

Restricting packet communication within the network IHS to a maximum allowable packet size is one method to control the complexity of data packet transfers. For example, the network IHS may require the maximum transmission size for any data packet to be no larger than the smallest maximum receive unit (MRU) of any particular network adapter of the network IHS. This method involves restrictions that may introduce undesirable effects, such as long transfer times, communication latency effects and other negative communication effects. For example, if any particular network adapter of the network IHS exhibits an MRU of 9 kilobytes, then operating system software may limit each data packet transfer within the network IHS to 9 kilobytes or smaller.

In one physical network IHS, the operating system of the network IHS constrains each network adapter to communicate with the same maximum transmission unit (MTU) or otherwise maximum transmission size for data packet transfers. The network determines the smallest maximum receive unit (MRU) of any communications network adapter, and constrains the maximum transmission unit (MTU) of the entire network to that value.

In the disclosed virtual network, operating systems may employ virtual adapters that exhibit greater data packet size communication capability than the smallest MRU of the entire virtual network. For example, a particular virtual adapter may exhibit a capability to manage or receive a super jumbo packet that exhibits a data packet size of 64 kilobytes (super jumbo size). As described below, if another virtual adapter exhibits a similar capability to receive jumbo packets, those virtual adapters may communicate with each other using a 64 kilobyte data packet size even though a third virtual adapter in the virtual network may only have the ability to receive 9 kilobyte data packets (jumbo size). In this case, communications between virtual adapters that support super jumbo packet communications or other data packet sizes may exhibit an increase in communication efficiency over other smaller packet transfers.

FIG. 1 shows an information handling system 100 with an MRU packet manager 180 that employs the disclosed packet manager methodology. IHS 100 includes a processor 105 that may include multiple cores. IHS 100 processes, transfers, communicates, modifies, stores or otherwise handles information in digital form, analog form or other form. IHS 100 includes a bus 110 that couples processor 105 to system memory 125 via a memory controller 115 and memory bus 120. In one embodiment, system memory 125 is external to processor 105. System memory 125 may be a static random access memory (SRAM) array or a dynamic random access memory (DRAM) array. Processor 105 may also include local memory (not shown) such as L1 and L2 caches (not shown). A video graphics controller 130 couples display 135 to bus 110. Nonvolatile storage 140, such as a hard disk drive, CD drive, DVD drive, or other nonvolatile storage couples to bus 110 to provide IHS 100 with permanent storage of information. I/O devices 150, such as a keyboard and a mouse pointing device, couple to bus 110 via I/O controller 160 and I/O bus 155.

One or more expansion busses 165, such as USB, IEEE 1394 bus, ATA, SATA, PCI, PCIE, DVI, HDMI and other busses, couple to bus 110 to facilitate the connection of peripherals and devices to IHS 100. A network interface adapter 170 couples to bus 110 to enable IHS 100 to connect by wire or wirelessly to a network and other information handling systems. In this embodiment, network interface adapter 170 may also be called a network communication adapter or a network adapter. While FIG. 1 shows one IHS that employs processor 105, the IHS may take many forms. For example, IHS 100 may take the form of a desktop, server, portable, laptop, notebook, netbook, tablet or other form factor computer or data processing system. IHS 100 may take other form factors such as a gaming device, a personal digital assistant (PDA), a portable telephone device, a communication device or other devices that include a processor and memory.

IHS 100 employs an operating system (OS) 190 that may store information on nonvolatile storage 145. IHS 100 includes a computer program product on digital media 175 such as a CD, DVD or other media. In one embodiment, a designer or other entity configures the computer program product with packet manager 180 software to practice the packet manager methodology. In practice, IHS 100 may store packet manager 180 and OS 190 on nonvolatile storage 145 as packet manager 180' and OS 190. When IHS 100 initializes, the IHS loads packet manager 180' and OS 190 into system memory 125 for execution as packet manager 180" and OS 190', respectively.

As will be appreciated by one skilled in the art, aspects of the disclosed packet manager methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product, such as computer program product 175 embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. (Java is a trademark of Oracle Corporation.) The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIG. 4 and FIG. 5 flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts of FIG. 4 and FIG. 5 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 4:
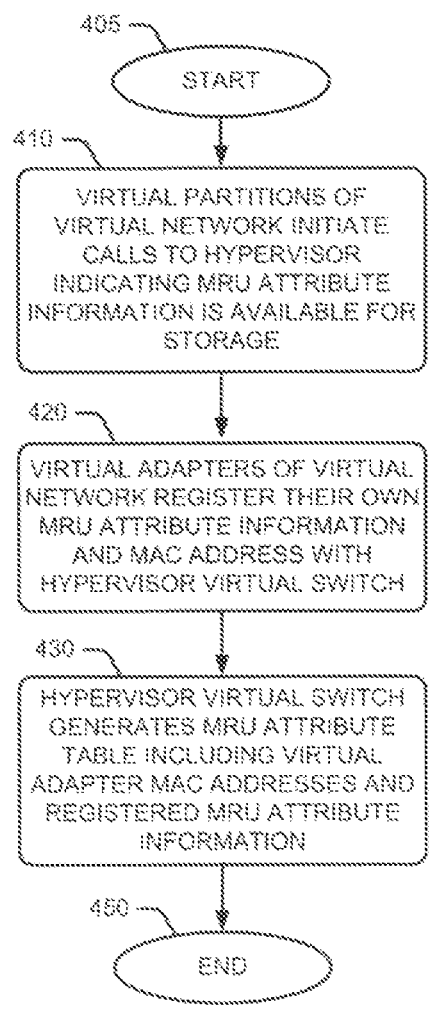
FIG. 4 is a flowchart of an embodiment of the disclosed packet manager methodology that provides virtual adapter MRU attribute registration.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart of FIG. 4 and FIG. 5 described below.

Figure 2:
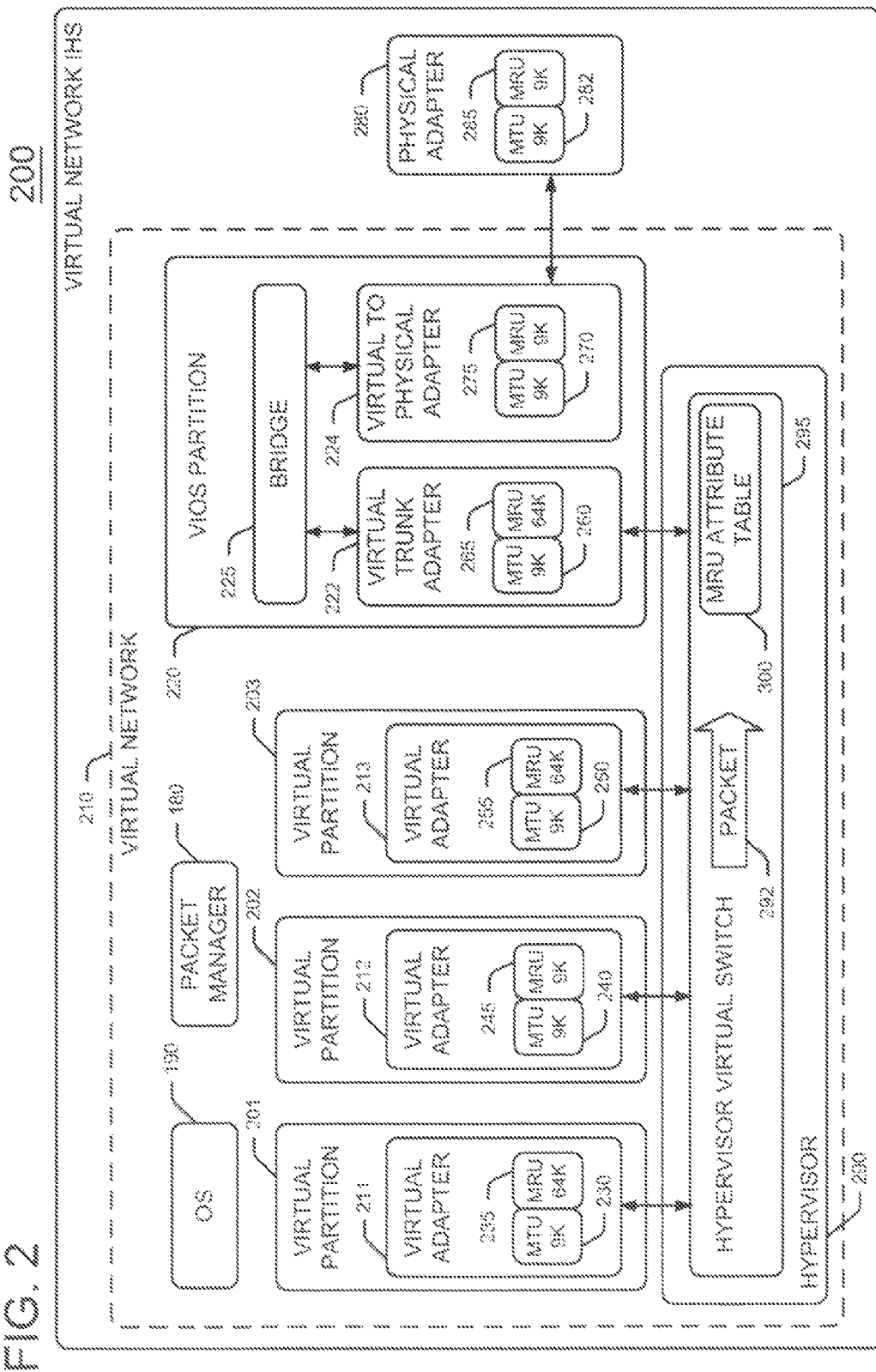
FIG. 2 is a block diagram of a virtual network IHS that employs the disclosed packet manager methodology.

FIG. 2 is a block diagram representation of a virtual network IHS 200 that a designer or other entity configures with packet manager 180 according to the disclosed packet manager methodology. Virtual network IHS 200 is an emulation of a physical network, such as an Ethernet network environment in software shown inside dashed lines as a virtual network 210. Virtual network 210 may be a virtual central electronic complex (CEC), or other virtual environment operating within memory or other locations of the real, physical IHS 100. Virtual network 210 includes operating system OS 190 and packet manager 180 for implementation of the disclosed packet manager methodology within a virtual environment. In one embodiment, virtual network 210 implements a virtual Ethernet protocol network in software environment that provides users and other entities a virtualization of physical Ethernet devices and architecture.

Virtual network 210 may include multiple virtual partitions. In one embodiment, virtual network 210 includes a virtual partition 201, a virtual partition 202, a virtual partition 203, and a virtual input/output server (VIOS) partition 220. Virtual partition 201 includes a virtual adapter 211. Virtual partition 202 includes a virtual adapter 212. Virtual partition 203 includes a virtual adapter 213, and VIOS partition 220 includes a virtual trunk adapter 222 and a virtual to physical adapter 224. Each virtual adapter of virtual network 210 provides packet communication capability, such as Ethernet data packet frame communication, with other virtual adapters of virtual network IHS 200.

A bridge 225 couples to both virtual trunk adapter 222 and virtual to physical adapter 224 to provide a communication path between each virtual adapter of VIOS partition 220 as well as other virtual adapters of VIOS partition 220 not shown. In one embodiment of the disclosed packet manager methodology, virtual adapter 211 exhibits a maximum transmission unit MTU 230 of 9 kilobytes (jumbo size) and a maximum receive unit MRU 235 of 64 kilobytes (super jumbo size). MTU 230 defines the maximum packet size that virtual adapter 211 may transmit during packet communications with other virtual adapters of virtual network IHS 200. MRU 235 defines the maximum packet size that virtual adapter 211 may receive from other virtual adapters of virtual network IHS 200 during packet communications, such as Ethernet packet transfers. In one embodiment, virtual partition 201 represents an advanced interactive executive (AIX) operating system that includes at least one virtual adapter for Ethernet packet communications. (AIX is a registered trademark of the International Business Machines Corporation.)

Virtual adapter 212 exhibits a maximum transmission unit MTU 240 of 9 kilobytes (jumbo size) and a maximum receive unit MRU 245 of 9 kilobytes (jumbo size). MTU 240 defines the maximum packet size that virtual adapter 212 may transmit during packet communications to other virtual adapters of virtual network IHS 200. MRU 245 defines the maximum packet size that virtual adapter 212 may receive from other virtual adapters of virtual network IHS 200 during packet communications, such as Ethernet packet transfers. In one embodiment, virtual partition 202 represents a LINUX operating system that includes at least one virtual adapter for Ethernet packet communications. (Linux is the registered trademark of Linus Torvalds.) Virtual adapter 212 exhibits an MRU 245 of 9 kilobytes (jumbo size). Since MRU 245 is 9 kilobytes that means virtual adapter 212 and thereby virtual partition 202 may receive packets of no greater than 9 kilobytes in size during virtual network IHS 200 packet communications.

Virtual adapter 213 exhibits an MTU 250 of 9 kilobytes (jumbo size) and a MRU 255 of 64 kilobytes (super jumbo size). MTU 250 defines the maximum packet size that virtual adapter 213 may transmit during packet communications to other virtual adapters of virtual network IHS 200. MRU 255 defines the maximum packet size that virtual adapter 213 may receive from other virtual adapters of virtual network IHS 200 during packet communications, such as Ethernet packet transfers. In one embodiment, virtual partition 203 represents an AIX operating system that includes at least one virtual adapter for Ethernet packet communications. Virtual adapter 213 exhibits an MRU 255 of 64 kilobytes or super jumbo packet size. Since MRU 255 is 64 kilobytes that means virtual adapter 213 may receive packets of less than, but no greater than 64 kilobytes in size during virtual network IHS 200 packet communications.

Virtual trunk adapter 222 exhibits an MTU 260 of 9 kilobytes (jumbo size) and an MRU 265 of 64 kilobytes (super jumbo size). MTU 260 defines the maximum packet size that virtual trunk adapter 222 may transmit during packet communications to other virtual adapters of virtual network IHS 200. MRU 265 defines the maximum packet size that virtual trunk adapter 222 may receive from other virtual adapters of virtual network IHS 200 during packet communications, such as Ethernet packet transfers. VIOS partition 220 includes a virtual to physical adapter 224 exhibiting an MTU 270 of 9 kilobytes (jumbo size) and an MRU 275 of 9 kilobytes (jumbo size). MTU 270 defines the maximum packet size that virtual to physical adapter 224 may transmit during packet communications to other virtual adapters of virtual network IHS 200. MRU 275 defines the maximum packet size that virtual to physical adapter 224 may receive from other virtual adapters of virtual network IHS 200 during packet communications, such as Ethernet packet transfers. Virtual to physical adapter 224 couples to a physical adapter 280 that represents a real world network adapter. In one embodiment, network adapter 170 of IHS 100 may be used as physical adapter 280 of FIG. 2. Physical adapter 280 exhibits an MTU 282 of 9 kilobytes (jumbo size) and an MRU 285 of 9 kilobytes (jumbo size).

In one embodiment, physical adapter 280 represents a real world network adapter that interfaces to virtual network 210 through virtual to physical adapter 224 of VIOS partition 220. Virtual to physical adapter 224 is a representation of physical adapter 280 in the virtual environment of virtual network 210. In other words, virtual network adapters of virtual network IHS 200 treat virtual to physical adapter 224 as though it is the real or physical adapter, namely physical adapter 280. In this manner, virtual adapters of virtual network IHS 200 may communicate to physical adapter 280 through virtual physical adapter 224 and VIOS partition 220 manages the actual communication of packets back and forth between virtual to physical adapter 224 and physical adapter 280. Virtual adapter 211, virtual adapter 212, virtual adapter 213, virtual trunk adapter 222, and virtual to physical adapter 224 are virtual entities of virtual network IHS 200 that may exist in real memory of an IHS such as IHS 100. However, physical adapter 280 is a real world physical entity of virtual network IHS 200.

Virtual network IHS 200 includes a hypervisor 290 that allocates hardware resources such as processor, memory and hardware resources to partitions and operating systems. In virtual network IHS 200, hypervisor 290 includes a hypervisor virtual switch 295. Hypervisor virtual switch 295 couples virtual adapter 211, virtual adapter 212, virtual adapter 213, and virtual trunk adapter 222 to each other to provide packet communication capability thereto. Hypervisor virtual switch 295 includes a packet 292 that represents a packet communication from one virtual adapter to another virtual adapter or physical adapter of virtual network IHS 200. For example, packet 292 may represent an Ethernet packet from a sending virtual adapter, such as virtual adapter 211 to a receiving virtual adapter, such as virtual adapter 212.

In one embodiment of the disclosed packet manager methodology, packet 292 represents a packet communication from virtual adapter 211 to virtual trunk adapter 222 and continuing through bridge 225 to virtual to physical adapter 224 and ultimately to physical adapter 280. Packet 292 may represent packet communication between any virtual or real adapter of virtual network IHS 200. Packet 292 may also represent any size of data packet transfer, such as a normal 1.5 kilobyte Ethernet packet, a jumbo 9 kilobyte Ethernet packet. Packet 292 may also represent a super jumbo 64 kilobyte Ethernet packet or other size or configuration of data packet transfer.

Because virtual adapter 212 exhibits an MRU 245 of 9 kilobytes, representing a jumbo packet, virtual partition 202 limits or forces packet communication sizes to jumbo packet sizes that size being the same as in real world packet communications. However, because virtual adapter 211 exhibits an MRU 235 of 64 kilobytes, or super jumbo packet size, virtual partition 201 may provide a much larger packet size communication than a real world counterpart, such as that of an AIX or other operating system in a physical network. In order for virtual network IHS 200 to take advantage of larger than jumbo packet transfers, virtual network IHS may implement packet manager 180 to store and retrieve virtual adapter MRU attributes. Hypervisor virtual switch 295 includes an MRU attribute table 300 described in more detail below.

FIG. 3 is a representation of MRU attribute table 300 that virtual network IHS 200, and more specifically hypervisor virtual switch 295, employs in the disclosed packet manager methodology. MRU attribute table 300 represents one method of storing or setting MRU attribute data and providing network addressing information for each virtual adapter of virtual network IHS 200. As described in more detail below, each particular virtual adapter of virtual network IHS 200 registers or sets the MRU value for each particular virtual adapter, thus generating registered MRU data with hypervisor 290 and more particularly with hypervisor virtual switch 295. MRU attribute table 300 stores and maintains registered MRU data that is settable attribute data for each virtual adapter of virtual network IHS 200.

Each virtual adapter of virtual network IHS 200 may register MRU attribute information within MRU attribute table 300. For example, virtual adapter 211 may register an MRU 235 value of 64 kilobytes (super jumbo size) within MRU attribute table 300, as shown. Virtual adapter 212 may register an MRU 245 value of 0 kilobytes within MRU attribute table 300 to indicate a non-registered MRU value, as discussed in more detail below. Virtual adapter 213 may register an MRU 255 value of 64 kilobytes (super jumbo size) within MRU attribute table 300. Virtual trunk adapter 222 may register an MRU 265 value of 64 kilobytes (super jumbo size) within MRU attribute table 300. Virtual to physical adapter 224 may register an MRU 275 value of 9 kilobytes (jumbo size) within MRU attribute table 300. Any other virtual adapters, not shown, within virtual network IHS 200 may also register their particular MRU attribute values within MRU attribute table 300 of hypervisor virtual switch 295.

In one embodiment of the disclosed packet manager methodology, MRU attribute table 300 stores virtual adapter media access control (MAC) address and registered MRU attribute information for each virtual adapter of virtual network IHS 200. As shown in FIG. 3, MRU attribute table 300 includes a row of information for each virtual adapter of virtual network IHS 200 in column 310. Column 320 depicts MRU attribute table entry data for each MAC address for the respective virtual adapters of virtual network IHS 200. Registered MRU data for each virtual adapter of virtual network IHS 200 is shown in column 330 of MRU attribute table 300. For example, as shown in row 350, MRU attribute table 300 includes a virtual adapter 211 entry in column 310 and corresponding MAC address for virtual adapter 211 in column 320. MRU attribute table 300 includes a registered MRU 235 data entry of 64 kilobytes for virtual adapter 211 in row 350, column 330.

MRU attribute table 300 includes a virtual adapter 212 entry in row 360, column 310, and corresponding MAC address for virtual adapter 212 in row 360, column 320. MRU attribute table 300 includes a registered MRU 245 data entry of 0 kilobytes for virtual adapter 212 in row 350 column 330. In this case, an MRU data entry for virtual adapter 212=0 kilobytes indicating that virtual adapter 212 is an adapter of virtual network 210 with a non-registered MRU value. In other words, if MRU=0 kilobytes in MRU attribute table 300 for any particular virtual adapter as shown in column 310, that particular virtual adapter is a virtual adapter of virtual network 210 with no MRU registration. MRU attribute table 300 includes a virtual adapter 213 entry in row 370, column 310, and corresponding MAC address for virtual adapter 213 in row 370, column 320. MRU attribute table 300 includes a registered MRU 255 data entry of 64 kilobytes for virtual adapter 213 in row 360, column 330.

MRU attribute table 300 includes a virtual trunk adapter 222 entry in row 380, column 310, and corresponding MAC address for virtual trunk adapter 222 in row 380, column 320. MRU attribute table 300 includes a registered MRU 265 data entry of 64 kilobytes (super jumbo size) for virtual trunk adapter 222 in row 380, column 330. MRU attribute table 300 includes a virtual to physical adapter 224 entry in row 390, column 310, and corresponding MAC address for virtual to physical adapter 224 in row 390, column 320. MRU attribute table 300 includes a registered MRU 275 data entry of 9 kilobytes (jumbo size) for virtual to physical adapter 224 in row 390, column 330. Other embodiments of the disclosed MRU attribute table are possible that employ variations on MAC address, registered MRU data entry and other information that each virtual adapter of virtual network IHS 100 exhibit.

In some cases, as described in more detail below, a particular partition of network IHS 200 may not register MRU values for their respective virtual adapters with MRU attribute table 300 of hypervisor virtual switch 295. In this case, the operating system of the particular partition is indicating a lack of ability or desire in using the enhanced capabilities of packet manager 180. In one embodiment of the disclosed packet manager methodology, MRU attribute table 300 may still generate a table entry for those non-registered virtual adapters and exhibit an MRU data entry=0 kilobytes for those table entries. Packet manager 180, or other entities of virtual network IHS 200, may use different values of registered MRU data or other methods not shown to indicate a non-registered virtual adapter within MRU attribute table 300.

The flowcharts of FIG. 4 and FIG. 5 illustrate the architecture, functionality, and operation of possible implementations of systems, methods and computer program products that perform data packet management in accordance with various embodiments of the present invention. In this regard, each block in the flowcharts of FIG. 4 and FIG. 5 may represent a module, segment, or portion of code, which comprises one or more executable instructions for implementing the specified logical function(s). It should also be noted that, in some alternative implementations, the functions noted in the block may occur out of the order noted in FIG. 4 and FIG. 5. For example, two blocks shown in succession may, in fact, be executed substantially concurrently, or the blocks may sometimes be executed in the reverse order, depending upon the functionality involved. It will also be noted that each block of FIG. 4 and FIG. 5 and combinations of blocks in the block diagrams and/or flowchart illustration, can be implemented by special purpose hardware-based systems that perform the specified functions or acts, or combinations of special purpose hardware and computer instructions.

FIG. 4 is a flowchart that shows process flow in an embodiment of the disclosed packet manager methodology that provides registration of virtual adapter MRU data within MRU attribute table 300. More specifically, the flowchart of FIG. 4 shows how the virtual partitions, namely virtual partition 201, virtual partition 202, virtual partition 203, and VIOS partition 220 store MRU attribute data along with MAC address information for each virtual adapter of virtual network 210. The disclosed packet manager method starts, as per block 405. In one embodiment, virtual partitions of virtual network 210 initiate calls to hypervisor 290 indicating MRU attribute information is available for storage as per block 410.

For example, virtual partition 201 may initiate a call to hypervisor 290 indicating MRU attribute data for virtual adapter 211 is available for storage within MRU attribute table 300, as shown in FIG. 3 above. However, another virtual partition such as virtual partition 202 may initiate a call to hypervisor 290 indicating that MRU attribute data is not available for virtual adapter 212 for store within MRU attribute table 300. In this manner, virtual partition 202 indicates a desire not to register MRU attributes, and hypervisor 290 stores a value of 0 kilobytes for virtual adapter 212 within MRU attribute table 300. Virtual partition 203 initiates a call to hypervisor 290 indicating that MRU attribute data for virtual adapter 213 is available for store within MRU attribute table 300. Finally, VIOS partition 220 initiates a call to hypervisor 290 indicating MRU attribute data for virtual trunk adapter 222 and virtual to physical adapter 224 are available for storage within MRU attribute table 300.

Virtual adapters of virtual network 210 may register their own MRU attribute information and MAC address with hypervisor virtual switch 295, as per block 420. For example, virtual adapter 211 registers an MRU 235 data entry of 64 kilobytes and the MAC address for virtual adapter 211 with hypervisor virtual switch 295, as shown in MRU attribute table 300 row 350. Virtual adapter 212 registers an MRU data entry of 0 kilobytes and the MAC address for virtual adapter 212 with hypervisor virtual switch 295, as shown in MRU attribute table 300 row 360. Virtual adapter 213 registers an MRU 255 data entry of 64 kilobytes and the MAC address for virtual adapter 213 with hypervisor virtual switch 295, as shown in MRU attribute table 300 row 370. Virtual trunk adapter 222 registers an MRU 265 data entry of 64 kilobytes and the MAC address for virtual trunk adapter 222 with hypervisor virtual switch 295, as shown in MRU attribute table 300 row 380. Virtual to physical adapter 224 registers an MRU 255 data entry of 9 kilobytes and the MAC address for virtual to physical adapter 224 with hypervisor virtual switch 295, as shown in MRU attribute table 300 row 390.

After population in the above manner, MRU attribute table 300 now includes MRU attribute data for each virtual adapter of virtual network 210. However, any particular virtual adapter may opt out, or not register it's particular MRU data entry with hypervisor virtual switch 295 as the example of virtual adapter 212 depicts. In that case, hypervisor virtual switch 300 may exhibit an MRU data entry=0 kilobytes for that particular virtual adapter. That particular virtual adapter is a non-registered MRU virtual adapter and operating system software of virtual network IHS 200 may exhibit constraints for that particular virtual adapter with respect to packet communication sizes. Virtual network IHS 200 may constrain or otherwise limit the size of data packets that transfer in or out of a non-registered MRU virtual adapter in a similar fashion to that of a physical adapter that a physical or real world network IHS may include.

From the data collected during the virtual adapter registration process as described above, hypervisor virtual switch 295 generates MRU attribute table 300 including virtual adapter MAC addresses and registered MRU attribute information, as per block 430. The packet manager registration process ends, as per block 450. Virtual adapters initiate packet transfers for communication of data packet information between adapters of virtual network IHS 200. For example, a sending virtual adapter may initiate a packet 292 transfer to a receiving virtual adapter or physical adapter within virtual network IHS 200. Virtual adapter transfers may result in one or more cases or varieties of packet transfers. For one embodiment of the disclosed packet manager method, Table 1 below shows four cases or types of packet transfers between adapters of virtual network IHS 200.

TABLE 1

| | |
|---|---|
| Case 1 | MRU attribute table 300 includes the receiving virtual adapter MAC address and registered MRU value. |
| Case 2 | MRU attribute table 300 includes the receiving virtual adapter MAC address and non-registered MRU value. |
| Case 3 | MRU attribute table 300 does not include the receiving physical adapter MAC address but does include virtual trunk adapter with non-registered MRU value. |
| Case 4 | MRU attribute table 300 does not include the receiving physical adapter MAC address but does include virtual trunk adapter with registered MRU value. |

As shown in Table 1 above, packet transfers between virtual adapters and those between virtual and physical adapters of virtual network IHS 200 may fall into one of four categories or cases. Case 1 involves a scenario wherein a sending virtual adapter initiates packet 292 transfer to a registered virtual adapter of virtual network IHS 200. In this case, MRU attribute table 300 includes a MAC address and registered MRU data entry for the receiving virtual adapter. For example, virtual adapter 211 may send packet 292 to virtual adapter 213 this case 1 scenario. Case 2 involves a scenario wherein a sending virtual adapter initiates packet 292 transfer to a virtual adapter of virtual network IHS 200 with a non-registered MRU data entry. In this case, MRU attribute table 300 includes a MAC address for the receiving or destination virtual adapter, but does not include registered MRU attribute information. For example, see the MRU attribute table 300 wherein, the registered MRU data entry in row 360 and column 330 is 0 kilobytes.

Case 3 involves a scenario wherein a sending virtual adapter initiates a packet transfer to a physical adapter, wherein hypervisor 290 routes that packet transfer through a virtual trunk adapter of virtual network IHS 200 with a non-registered MRU data entry. In this case, the MRU attribute table 300 does not include a MAC address for the receiving or destination physical adapter, and does not include a registered MRU data entry for the virtual trunk adapter. In this scenario, a modified MRU attribute table 300 (not shown) does not include information in row 380 and column 330. In this modified scenario, wherein the MRU data entry in row 380 and column 330=0 kilobytes, virtual adapter 211 may send packet 292 to physical adapter 280 through virtual trunk adapter 222 and through virtual to physical adapter 224.

Case 4 involves a scenario wherein a sending virtual adapter initiates a packet transfer to a physical adapter of virtual network IHS 200. Hypervisor 290 routes that packet through a virtual trunk adapter with a registered MRU data entry or value. In this case, MRU attribute table 300 does not include a MAC address for the receiving physical adapter, however MRU attribute table 300 does include a MAC address and registered MRU data entry for the virtual trunk adapter. For example, virtual adapter 211 may send packet 292 to physical adapter 280. Hypervisor 290 routes packet 292 from virtual adapter 211 to physical adapter 280 through virtual trunk adapter 222 that exhibits a registered MRU data attribute or MRU 265 of 64 kilobytes. Hypervisor 290 may route packet 292 from virtual trunk adapter 222 to physical adapter 280 through virtual to physical adapter 224.

To summarize, case 1 demonstrates a particular virtual adapter packet transfer that benefits from the capabilities of large packet size transfers, such as the super jumbo packet size of 64 kilobytes or other data packet size transfers. Case 2 demonstrates the scenario wherein a particular virtual adapter transfers packets that reflect a physical world or real world network system that limits packet transfers to the lowest MTU of any particular adapter, such as the jumbo packet size of 9 kilobytes. Case 3 demonstrates a particular virtual adapter packet transfer that does match any particular virtual adapter within virtual network 210 and results in a non-registered MRU data entry. In case 3, the data packet transfers to VIOS partition 220 and ultimately to a physical entity or real world physical adapter, such as physical adapter 280 or other adapter not shown.

Case 4 demonstrates the scenario wherein a particular sending virtual adapter of virtual network 210 sends a particular packet, such as packet 292, to a receiving physical adapter 280. In this case, virtual trunk adapter 222 exhibits a registered MRU data entry indicating to the particular sending virtual adapter that the destination virtual adapter is virtual trunk adapter 222 and also virtual to physical adapter 224. For example, in case 4 the sending virtual adapter may send packet 292 to physical adapter 280. The sending virtual adapter first sends packet 292 to virtual trunk adapter 222. VIOS partition 220 transfers packet 292 from virtual trunk adapter 222 through bridge 225 to virtual to physical adapter 224. Virtual to physical adapter 225 exhibits an MRU 275 identical to MRU 285 of physical adapter 280. In this manner, virtual to physical adapter 224 provides a virtual adapter consistent with the physical requirements of physical adapter 280. VIOS partition 220 may initiate a send of packet 292 from virtual to physical adapter 224 to physical adapter 280 without any involvement of the sending virtual adapter, namely virtual adapter 211.

FIG. 5 is a flowchart that shows process flow in one embodiment of the disclosed packet manager methodology that provides MRU attribute discovery during packet transfers from one virtual adapter to another adapter of virtual network 210. The virtual adapter MRU attribute discovery method starts, as per block 505. Virtual adapter 211 initiates a packet transfer, as per block 510. In other words, a sending virtual adapter of virtual network 210, such as virtual adapter 211, initiates a packet transfer 292 to a receiving virtual adapter, such as virtual adapter 212. A sending virtual adapter, such as virtual adapter 211 may initiate a packet transfer 292 to a receiving physical adapter, such as physical adapter 280.

In one embodiment of the disclosed packet manager methodology, the sent packet 292 is an Ethernet data packet or frame that may be a normal packet of 1.5 kilobytes, a jumbo packet of 9 kilobytes, a super jumbo packet of 64 kilobytes or any other packet size that virtual network IHS 200 supports. Although, in this embodiment the sending virtual adapter is virtual adapter 211, in other embodiments of the disclosed packet manager method, any virtual adapter of virtual network IHS 200 may initiate a packet send operation and perform the functions of the sending virtual adapter. In other embodiments of the disclosed packet manager methodology, the receiving virtual adapter may be virtual adapter 213, virtual trunk adapter 222, virtual to physical trunk adapter 224, physical adapter 280 or any other adapter of virtual network IHS 200.

Packet manager 180 performs a test to determine if the packet destination MAC address matches a virtual adapter of virtual network 210, as per block 520. As shown by the case arrow in the FIG. 5 flowchart, namely "CASES 1 & 2", if the packet destination MAC address matches a virtual adapter in virtual network 210, packet manager 180 performs another test to determine if the receiving virtual adapter exhibits a registered MRU, as per block 530. As shown in TABLE 1 above, both case 1 and case 2 involve the scenario wherein MRU attribute table 300 of FIG. 3 includes a virtual adapter with a MAC address corresponding to the destination or receiving virtual adapter.

If MRU attribute table 300 includes a registered MRU value for the receiving virtual adapter, as shown by the arrow "CASE 1" in FIG. 5, hypervisor 290 returns the registered MRU and local status information, as per block 540. In other words, as case 1 defines, virtual adapter 211 initiates a packet send to a local MRU registered virtual adapter, such as virtual adapter 213. In one embodiment, the term "local" defines the boundaries of virtual network 210 and the virtual partitions and virtual adapters within. The term "remote" defines partitions and adapters that are outside of the boundaries of virtual network 210, such as physical adapter 280. The registered MRU data defines a virtual adapter within MRU attribute table 300 with any MRU data entry other than 0 kilobytes which designates non-registration.

If virtual network 210 were a physical network and not a virtualization, the physical network would likely exhibit normal constraints for packet size transfers. For example, since MTU 230 of virtual adapter 211 and MTU 250 of virtual adapter 213 are equal to 9 kilobytes, the maximum transmission size for a packet between virtual adapter 211 and virtual adapter 213 in a real world network is equal to the smallest MTU value or 9 kilobytes. However, since virtual adapter 211 and virtual adapter 213 exist in a virtual state, packet transfers need not limit themselves to minimum MTU size constraints. For example, a packet transfer from virtual adapter 211 to virtual adapter 213, may transfer in a super jumbo packet size of 64 kilobytes or any other packet size that both virtual adapter 211, virtual adapter 213, and packet manager 180 support. In one embodiment, virtual adapter 211 sends packet 292 through hypervisor virtual switch 295 with the registered MRU value as packet size, as per block 550.

For example, virtual adapter 211 sends a 64 kilobyte packet to virtual adapter 213 that matches the registered MRU data for virtual adapter 213 of 64 kilobytes as shown in FIG. 3 MRU attribute table 300 row 370, column 330. Virtual adapters may transmit any packet size the network will allow, even though they have lower MTUs for fallback purposes. Virtual network IHS 200 benefits from the packet manager 180 capability and performs more efficiently by communicating with larger packet sizes internal to virtual network 120, thereby increasing bandwidth or throughput and reducing overhead or communication latency effects.

If the receiving virtual adapter does not exhibit a registered MRU, as shown by the "CASE 2" arrow, hypervisor 290 returns MRU=0 kilobytes and local status, as per block 560. For example, if virtual adapter 211 initiates packet 292 transfer to virtual adapter 212, MRU attribute table 300 includes a registered MRU data entry of 0 kilobytes for virtual adapter 212, as shown in the FIG. 3 MRU attribute table 300, row 360, column 330. The non-registered MRU data entry indicates to packet manager 180 that the packet transfer from virtual adapter 211 to virtual adapter 212 may not benefit from larger packet sizes such as super jumbo or other larger packet sizes. Thus in this case 2, both virtual adapter 211 and virtual adapter 212 are local or within virtual network 210, and packet manager 180 limits the packet transfer size to the lowest MTU of each virtual adapter 211 and virtual adapter 213.

In one embodiment of the disclosed packet manager methodology, MTU 230 of virtual adapter 211 is 9 kilobytes and MTU 240 of virtual adapter 212 is 9 kilobytes. In this embodiment, packet manager 180 restricts packet 292 transfer from sending virtual adapter 211 to receiving virtual adapter 212 to 9 kilobytes, or that of a jumbo packet size. Packet manager 180 interprets the registered MRU data entry of 0 kilobytes as a non-registered receiving virtual adapter, namely virtual adapter 212. Packet manager 180 interprets receiving virtual adapter 212 communication or packet size capability as 9 kilobytes for this particular packet transfer and temporarily assigns 9 kilobytes as the registered MRU packet size for receiving virtual adapter 212 is this case 2 scenario. Virtual adapter 211 sends packet 292 through hypervisor virtual switch 295 with registered MRU packet size of 9 kilobytes, as per block 550.

The test of decision block 520, to determine if the packet destination MAC address matches the MAC address of a virtual adapter, may be negative, as indicated by the "CASE 3 & 4" arrow. Case 3 and case 4 both indicate a condition wherein the destination or receiving adapter does not match a local virtual adapter, such as virtual adapter 211, virtual adapter 212, or virtual adapter 213, but rather matches a physical adapter, such as physical adapter 280. In this event, packet manager 180 performs another test to determine if a particular virtual trunk adapter exists and exhibits a registered MRU, as per block 570. As shown by the "CASE 3" arrow, if virtual trunk adapter exists but does not exhibit a registered MRU, hypervisor 290 returns registered MRU=0 kilobytes and remote status, as per block 575.

In the case 3 scenario, the sending virtual adapter, such as virtual adapter 211, sends packet 292 to physical adapter 280 through virtual trunk adapter 222 and through virtual to physical adapter 224. In this case, virtual trunk adapter 222 exists with a non-registered MRU data entry in MRU attribute table 300. In other words, virtual trunk adapter 222 temporarily stands in as the receiving virtual adapter for the ultimate destination remote adapter, such as physical adapter 280. In one embodiment, the ultimate destination remote adapter does not register an MRU data entry with hypervisor 290. In this case, namely case 3, packet manager 180 exhibits normal constraints for packet communication sizes and interprets the lowest MTU of any adapter of virtual network IHS as 9 kilobytes and as packet 292 transfer size.

In more detail, in case 3 the virtual adapter 211 sends packet 292 through hypervisor virtual switch 292 as a packet size of 9 kilobytes to virtual trunk adapter 222. Virtual trunk adapter 222 sends packet 292 as a packet size of 9 kilobytes to virtual to physical adapter 224. Virtual to physical adapter 224 sends packet 292 as a packet size of 9 kilobytes to a remote physical adapter that matches the destination MAC address, such as physical adapter 280. In other words, virtual to physical adapter 224 temporarily stands in as the remote physical adapter for a case 3 packet 292 transfer scenario. Since there is no registered MRU data entry, in a case 3 scenario, normal or physical network constraints for packet 292 transfer size determination are in effect during any packet transfer. In this case, the lowest MTU of any adapter that packet manager 180 recognizes within virtual network IHS 200 becomes the packet transfer size for packet 292, namely 9 kilobytes.

In other cases, not shown, virtual trunk adapter 222 may serve as a temporary portal or communication path for packet 292 in route to other virtual adapters of VIOS partition 220. For example, virtual adapter 211 may send packet 292 through virtual trunk adapter 222 as a super jumbo packet size of 64 kilobytes. Virtual trunk adapter 222 may route super jumbo packet 292 through bridge 225 and to other virtual adapters of VIOS partition 220 not shown. In this manner, packet 292 communication with VIOS partition 220 may take advantage or large data packet sizes, such as those of super jumbo Ethernet data packets of 64 kilobytes or other sizes.

If the virtual trunk adapter exists with a registered MRU, as shown by the "CASE 4" arrow, hypervisor 290 returns the registered MRU and remote status, as per block 580. In case 4, virtual adapter 211 sends packet 292 to physical adapter 280 through virtual truck adapter 222 and receives a registered MRU data entry from hypervisor 290. For example, hypervisor virtual switch 295 may return a registered MRU value of 64 kilobytes, as shown in the FIG. 3 MRU attribute table 300 row 380, column 330. Virtual adapter 211 sends packet 292 through hypervisor virtual switch 295 with registered MRU packet size, as per block 550. For example, virtual adapter 211 may send a 64 kilobyte packet to virtual trunk adapter 222. Virtual trunk adapter 222 may reduce the 64 kilobyte packet to multiple 9 kilobyte packets and route to physical adapter 280 or to a remote destination adapter not shown. The disclosed packet manager methodology ends, as per block 595.

As will be appreciated by one skilled in the art, aspects of the disclosed memory management technology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of network communication, comprising:
configuring an information handling system (IHS) to include a virtual network;
configuring a plurality of virtual partitions in the virtual network, the plurality of virtual partitions being local to the virtual network;
configuring a respective virtual adapter in each of the virtual partitions, each virtual adapter exhibiting a respective maximum receive unit (MRU) and a respective maximum transmission unit (MTU), wherein some of the virtual adapters exhibit a different MRU than other of the virtual adapters;
providing a hypervisor virtual switch that couples the virtual adapters together;
configuring a virtual I/O server (VIOS) partition in the virtual network, wherein the VIOS partition includes a virtual trunk adapter that communicates with a virtual to physical adapter in the VIOS partition, wherein the virtual trunk adapter communicates with the plurality of virtual partitions via the hypervisor virtual switch, wherein the virtual to physical adapter communicates with a remote physical adapter that is outside the virtual network;
registering, by registered virtual adapters of the plurality of virtual adapters, a respective MRU in an MRU attribute table in the hypervisor virtual switch, thus providing a respective registered MRU for each registered virtual adapter, wherein the registering is performed by storing the MRUs of the registered virtual adapters in the MRU attribute table in the hypervisor virtual switch, the MRU attribute table including a media access control (MAC) address and associated MRU for each registered virtual adapter, the MRU attribute table further including a MAC address and an associated non-registered MRU data value for each non-registered virtual adapter of the plurality of virtual adapters;
initiating, by a sending virtual adapter, a packet transfer of a first packet to a receiving virtual adapter in the virtual network, to the virtual trunk adapter or to the remote physical adapter, the first packet exhibiting a packet transfer size;
testing, by a packet manager in the IHS, to determine if the first packet exhibits a destination MAC address that matches a virtual adapter MAC address in the MRU attribute table and, in the event of such a match, testing further to determine if the receiving virtual adapter exhibits a registered MRU in the MRU attribute table; and
in the event the receiving virtual adapter exhibits the registered MRU in the MRU attribute table, then sending, by the hypervisor virtual switch, the first packet to the receiving virtual adapter, the sending being performed by using the registered MRU of the receiving virtual adapter as the packet transfer size of the first packet, the receiving virtual adapter being a local virtual adapter; and
in the event the receiving virtual adapter does not exhibit the registered MRU in the MRU attribute table, then sending, by the hypervisor virtual switch, the first packet to the receiving virtual adapter using a lowest MTU of the sending virtual adapter and the receiving virtual adapter as the packet transfer size of the first packet; and
receiving, by the receiving virtual adapter, the first packet.

2. The method of claim 1, further comprising:
initiating, by a sending virtual adapter, a packet transfer of a second packet to the remote physical adapter that is a receiving adapter, the second packet exhibiting a packet transfer size;
testing, by the packet manager, to determine if the second packet exhibits a destination MAC address that matches a virtual adapter MAC address in the MRU attribute table and, in the event of no such match, testing further to determine if the MRU attribute table stores a registered MRU corresponding to the virtual trunk adapter, thus designating the virtual trunk adapter as a registered virtual trunk adapter if the MRU attribute table stores an MRU for the virtual trunk adapter or designating the virtual trunk adapter as a non-registered virtual trunk adapter if the MRU table does not store an MRU for the virtual trunk adapter.

3. The method of claim 1, further comprising, sending a second packet via the virtual trunk adapter and the virtual to physical adapter to the remote physical adapter, the virtual trunk adapter acting as a temporary stand-in virtual adapter for the remote physical adapter, the lowest MTU of any virtual adapter, virtual trunk adapter and virtual to physical adapter being used as the packet transfer size for the second packet.

4. The method of claim 1, wherein the receiving virtual adapter does not register its respective MRU with the hypervisor virtual switch, and the sending virtual adapter sends a packet transfer to the receiving virtual adapter, the packet transfer employing the MRU of the receiving virtual adapter.

5. The method of claim 1, further comprising:
communicating, by the virtual network, with a receiving adapter that is a physical adapter.

6. The method of claim 1, wherein the MRUs of respective virtual adapters exhibit one of a first MRU size and a second MRU size, the second MRU size being larger than the first MRU size, the sending virtual adapter sending packets exhibiting the first MRU size when the receiving virtual adapter exhibits the first MRU size, the sending virtual adapter sending packets exhibiting the second MRU size when the receiving virtual adapter exhibits the second MRU size.

7. An information handling system (IHS), comprising:
a processor;
a memory, coupled to the processor, the memory being configured as a virtual network including a plurality of virtual partitions, the plurality of virtual partitions being local to the virtual network, a respective virtual adapter being configured in each of the virtual partitions, each virtual adapter exhibiting a respective maximum receive unit (MRU) and a respective maximum transmission unit (MTU), wherein some of the virtual adapters exhibit a different MRU than other of the virtual adapters, a hypervisor virtual switch coupling the virtual adapters together, a virtual I/O server (VIOS) partition being configured in the virtual network, wherein the VIOS partition includes a virtual trunk adapter that communicates with a virtual to physical adapter in the VIOS partition, wherein the virtual trunk adapter communicates with the plurality of virtual partitions via the hypervisor virtual switch, wherein the virtual to physical adapter communicates with a remote physical adapter that is outside the virtual network, wherein the virtual network performs:
registering, by registered virtual adapters of the plurality of virtual adapters, a respective MRU an MRU attribute table in in the hypervisor virtual switch, thus providing a respective registered MRU for each registered virtual adapter, wherein the registering is performed by storing the MRUs of the registered virtual adapters in the MRU attribute table in the hypervisor virtual switch, the MRU attribute table including a media access control (MAC) address and associated MRU for each registered virtual adapter, the MRU attribute table further including a MAC address and an associated non-registered MRU data value for each non-registered virtual adapter of the plurality of virtual adapters;

initiating, by a sending virtual adapter, a packet transfer of a first packet to a receiving virtual adapter in the virtual network, to the virtual trunk adapter or to the remote physical adapter, the first packet exhibiting a packet transfer size testing, by a packet manager in the IHS, to determine if the first packet exhibits a destination MAC address that matches a virtual adapter MAC address in the MRU attribute table and, in the event of such a match, testing further to determine if the receiving virtual adapter exhibits a registered MRU in the MRU attribute table; and in the event the receiving virtual adapter exhibits the registered MRU in the MRU attribute table, then sending, by the hypervisor virtual switch, the first packet to the receiving virtual adapter, the sending being performed by using the registered MRU of the receiving virtual adapter as the packet transfer size of the first packet, the receiving virtual adapter being a local virtual adapter; and in the event the receiving virtual adapter does not exhibit the registered MRU in the MRU attribute table, then sending, by the hypervisor virtual switch, the first packet to the receiving virtual adapter using a lowest MTU of the sending virtual adapter and the receiving virtual adapter as the packet transfer size of the first packet; and receiving, by the receiving virtual adapter, the packet transfer.

8. The IHS of claim 7, wherein the virtual network further performs:
initiating, by a sending virtual adapter, a packet transfer of a second packet to the remote physical adapter that is a receiving adapter, the second packet exhibiting a packet transfer size;
testing, by the packet manager, to determine if the second packet exhibits a destination MAC address that matches a virtual adapter MAC address in the MRU attribute table and, in the event of no such match, testing further to determine if the MRU attribute table stores a registered MRU corresponding to the virtual trunk adapter, thus designating the virtual trunk adapter as a registered virtual trunk adapter if the MRU attribute table stores an MRU for the virtual trunk adapter or designating the virtual trunk adapter as a non-registered virtual trunk adapter if the MRU table does not store an MRU for the virtual trunk adapter.

9. The IHS of claim 7, wherein the virtual network performs:
sending a second packet via the virtual trunk adapter and the virtual to physical adapter to the remote physical adapter, the virtual trunk adapter acting as a temporary stand-in virtual adapter for the remote physical adapter, the lowest MTU of any virtual adapter, virtual trunk adapter and virtual to physical adapter being used as the packet transfer size for the second packet.

10. The IHS of claim 7, wherein the receiving virtual adapter does not register its respective MRU with the hypervisor virtual switch, and the sending virtual adapter sends a packet transfer to the receiving virtual adapter, the packet transfer employing the MRU of the receiving virtual adapter.

11. The IHS of claim 7, wherein the virtual network communicates with a receiving adapter that is a physical adapter of the IHS.

12. The IHS of claim 11, wherein the MRUs of respective virtual adapters exhibit one of a first MRU size and a second MRU size, the second MRU size being larger than the first MRU size, wherein the sending virtual adapter sends packets exhibiting the first MRU size when the receiving virtual adapter exhibits the first MRU size, the sending virtual adapter sending packets exhibiting the second MRU size when the receiving virtual adapter exhibits the second MRU size.

13. A computer program product, comprising:
- a non-transitory computer readable storage medium for use on an information handling system (IHS) that includes a virtual network;
- first instructions that configure a plurality of virtual partitions in the virtual network, the plurality of virtual partitions being local to the virtual network;
- second instructions that configure a respective virtual adapter in each of the virtual partitions, each virtual adapter exhibiting a respective maximum receive unit (MRU) and a respective maximum transmission unit (MTU), wherein some of the virtual adapters exhibit a different MRU than other of the virtual adapters;
- third instructions that provide a hypervisor virtual switch that couples the virtual adapters together;
- fourth instructions that configure a virtual I/O server (VIOS) partition in the virtual network, wherein the VIOS partition includes a virtual trunk adapter that communicates with a virtual to physical adapter in the VIOS partition, wherein the virtual trunk adapter communicates with the plurality of virtual partitions via the hypervisor virtual switch, wherein the virtual to physical adapter communicates with a remote physical adapter that is outside the virtual network;
- fifth instructions that register virtual adapters of the plurality of virtual adapters thus designating registered virtual adapters, a respective MRU in an MRU attribute table in the hypervisor virtual switch, thus providing a respective registered MRU for each registered virtual adapter, wherein the registering is performed by storing the MRUs of the registered virtual adapters in the MRU attribute table in the hypervisor virtual switch, the MRU attribute table including a media access control (MAC) address and associated MRU for each registered virtual adapter, the MRU attribute table further including a MAC address and an associated non-registered MRU data value for each non-registered virtual adapter of the plurality of virtual adapters;
- sixth instructions that initiating, by a sending virtual adapter, a packet transfer of a first packet to a receiving virtual adapter in the virtual network, to the virtual trunk adapter or to the remote physical adapter, the first packet exhibiting a packet transfer size;
- seventh instructions that test, by a packet manager in the IHS, to determine if the first packet exhibits a destination MAC address that matches a virtual adapter MAC address in the MRU attribute table and, in the event of such a match, testing further to determine if the receiving virtual adapter exhibits a registered MRU in the MRU attribute table;
- eighth instructions that wherein in the event the receiving virtual adapter exhibits the registered MRU in the MRU attribute table, then sending, by the hypervisor virtual switch, the first packet to the receiving virtual adapter, the sending being performed by using the registered MRU of the receiving virtual adapter as the packet transfer size of the first packet, the receiving virtual adapter being a local virtual adapter;
- ninth instructions that wherein in the event the receiving virtual adapter does not exhibit the registered MRU in the MRU attribute table, then sending, by the hypervisor virtual switch, the first packet to the receiving virtual adapter using a lowest MTU of the sending virtual adapter and the receiving virtual adapter as the packet transfer size of the first packet;
- wherein the first, second, third, fourth, fifth, sixth, seventh, eighth and ninth instructions are stored on the computer readable storage medium.

14. The computer program product of claim 13, further comprising:
- tenth instructions that initiate, by a sending virtual adapter, a packet transfer of a second packet to the remote physical adapter that is a receiving adapter, the second packet exhibiting a packet transfer size;
- eleventh instruction that test, by the packet manager, to determine if the second packet exhibits a destination MAC address that matches a virtual adapter MAC address in the MRU attribute table and, in the event of no such match, testing further to determine if the MRU attribute table stores a registered MRU corresponding to the virtual trunk adapter, thus designating the virtual trunk adapter as a registered virtual trunk adapter if the MRU attribute table stores an MRU for the virtual trunk adapter or designating the virtual trunk adapter as a non-registered virtual trunk adapter if the MRU table does not store an MRU for the virtual trunk adapter.

15. The computer program product of claim 14, further comprising:
- twelfth instructions that send the second packet via the virtual trunk adapter and the virtual to physical adapter to the remote physical adapter, the virtual trunk adapter acting as a temporary stand-in virtual adapter for the remote physical adapter, the lowest MTU of any virtual adapter, virtual trunk adapter and virtual to physical adapter being used as the packet transfer size for the second packet.

16. The computer program product of claim 13, further comprising thirteenth instructions that instruct the receiving virtual adapter to not register its respective MRU with the hypervisor virtual switch, and that instruct the sending virtual adapter to send a packet transfer to the receiving virtual adapter, the packet transfer employing the MRU of the receiving virtual adapter.

17. The computer program product of claim 13, further comprising fourteenth instructions that instruct the virtual network to communicate with a receiving adapter that is a physical adapter.

18. The computer program product of claim 13, further comprising fifteenth instructions that instruct virtual network operation wherein the MRUs of respective virtual adapters exhibit one of a first MRU size and a second MRU size, the second MRU size being larger than the first MRU size, the sending virtual adapter sending packets exhibiting the first MRU size when the receiving virtual adapter exhibits the first MRU size, the sending virtual adapter sending packets exhibiting the second MRU size when the receiving virtual adapter exhibits the second MRU size.

* * * * *